May 30, 1967
R. STUART
3,322,156
CAN AND METHOD OF MAKING SAME
Filed May 3, 1963
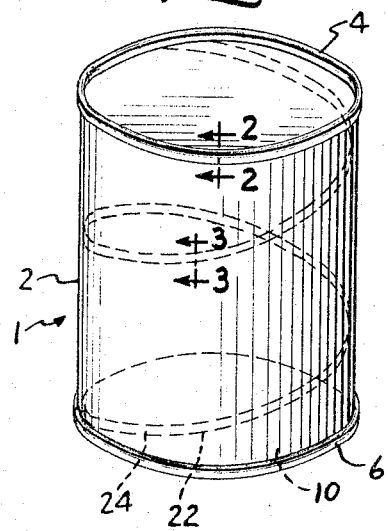
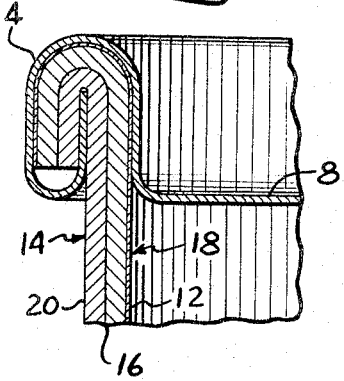
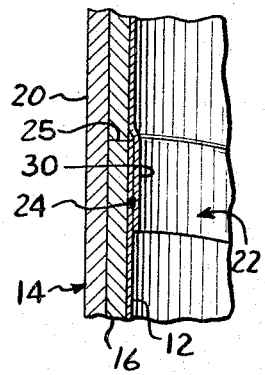
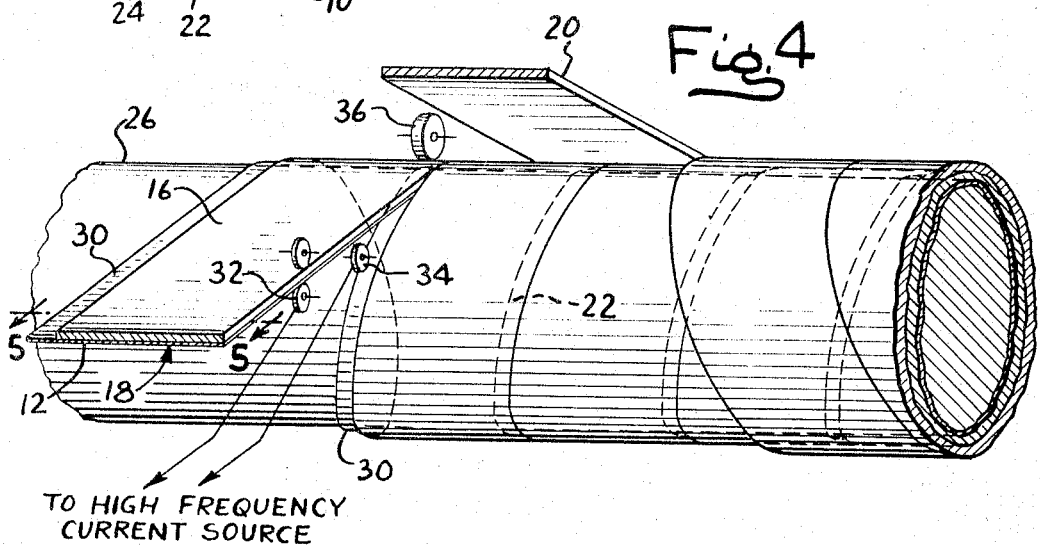
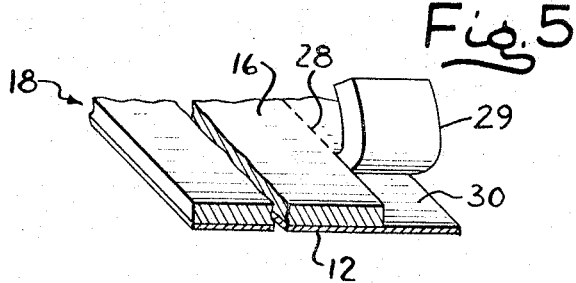
INVENTOR.
ROBERT STUART
BY
ATTY.

3,322,156
CAN AND METHOD OF MAKING SAME
Robert Stuart, Chicago, Ill., assignor to National Can Corporation, Chicago, Ill., a corporation of Delaware
Filed May 3, 1963, Ser. No. 277,788
7 Claims. (Cl. 138—143)

This invention relates to improvements in cans of the helically wound type and to a method of making same.

It is an object of the present invention to provide a can, the body of which is helically wound and has an inner layer of metallic foil that forms a liquid-tight barrier on the inside of the can body. Such a barrier prevents wicking or leakage of liquids in the can through the can body and permits the use of an outer body-rigidifying liner of paper, or other porous materials.

It is a further object of the present invention to provide a can the body of which has an inner layer of helically wound metallic foil with the adjacent turns of the foil being overlapped and secured together by a continuous weld along the lap of the foil. The continuous weld provides a liquid-tight seal at the seam formed by the helical winding, and thus prevents leakage or wicking at the seam, which is the place where leakage or wicking is most likely to occur.

It is a further object of the present invention to provide a method of making a helically wound container body in which a metallic foil strip is wound helically on a mandrel, and a helical seam is formed during the winding, and wherein the seam is welded by a continuous weld that extends along the seam.

It is another object of the present invention to provide a method of the type stated in which the metallic foil has a web that is laminated thereto, and wherein the foil extends laterally of the web for overlapping seam-forming engagement with the adjacent turn of the web.

The attainment of the above and further objects of the present invention will be apparent from the following specification taken in conjunction with the accompanying drawing forming a part thereof.

In the drawing:

FIG. 1 is a perspective view of a can constructed in accordance with and embodying the present invention;

FIGS. 2 and 3 are fragmentary sectional views, on an enlarged scale, taken along lines 2—2 and 3—3 of FIG. 1;

FIG. 4 is a fragmentary perspective view illustrating a method of making the can body of the present invention; and FIG. 5 is a fragmentary sectional view taken along line 5—5 of FIG. 4.

Referring now to the drawing, in which like reference numerals indicate like parts throughout, 1 designates a can having a cylindrical body 2 of helically wound material. Secured to the opposite ends of the body 2 by box seams 4, 6 are conventional sheet metal top and bottom can ends 8, 10.

The can body comprises an inner helically wound metallic foil strip 12, as for instance, aluminum or tin foil, and the outer surface of the foil strip 12 is overlaid by a lining 14. This lining 14 may be of one or more layers of any suitable material, such as paper, plastic, etc. that is of sufficient thickness and strength to sustain the shape of the can body and provide the requisite strength to hold the contents intended for the can. Preferably the lining 14 includes an inner paper layer 16 that is laminated to the foil strip 12 so that the foil strip 12 and layer 16 constitute a composite tape 18 (FIGS. 4 and 5) that is helically wound, as will presently be more fully described. The lining 14 may also include one or more outer layers 20 helically wound over the tape 18. The outer layer or layers 20 may likewise be of paper, plastic, metal, or any other suitable material.

The adjacent turns of the foil 12 are edgewise overlapped in the provision of a helical lapped seam 22 that is secured by a continuous helical weld 24 of the same pitch and in the same direction as the seam 24. The foil 12 thus provides a liquid-tight barrier to prevent leakage or wicking of fluid across the seam 22. The adjacent edges of the paper layer 16 may be abutting, as at 25.

Referring now to FIGS. 4 and 5, the tape 18 and outer layer tape 20 may be withdrawn from suitable supply rolls and helically wound upon a fixed mandrel 26, which is of a suitable material that does not conduct electricity. The wound tubular member formed may be axially advanced by suitable known belt driving mechanism as, for instance, shown in the U.S. Patent No. 2,130,355.

The tape 18 has a longitudinally extending score line 28 through the layer 16 so that prior to feeding the tape 18 onto the mandrel 26, a strip 29 of the layer 16 may be separated from the tape to expose a strip or band of foil 30 that extends laterally of the remaining portion of the layer 16 and is of a width which is a minor fractional part of the width of the tape 18.

Welding electrodes 32, 34 are used in the welding of the seam 22. These electrodes 32, 34 may be in the form of rollers. One electrode 32 contacts the leading edge of the foil adjacent to the mandrel 26. The other electrode 34 contacts the foil band 30 of the preceding turn, that is, the turn that was just wrapped onto the mandrel. The welding electrodes 32, 34 are connected to a suitable source of alternating current, for example, of the order of 100,000 cycles per second. Welding apparatus of the general type that may be used in carrying out the present invention may be found in U.S. Patents No. 2,873,353, No. 3,073,944, and No. 3,073,945. The high frequency current flowing between the electrodes 32, 34 heats the overlapped edges of the foil to welding temperature. A pressure roller 36 may be utilized to press the heated edges of the foil together and insure a firm fusing of the metal at the seam 22.

The tubular member thus formed may be cut into suitable can body lengths in any well known manner, as by a flying saw. Likewise, the can ends 8, 10 may be secured to the can body 2 by conventional can making and can sealing equipment. While the tape 18 is shown as being a composite foil and paper laminate, it will be apparent that a tape foil alone may be helically wrapped and continuously welded in the manner just described, even though the foil alone is insufficient to sustain the shape of the can body. While the foil is still on the mandrel, one or more additional tapes of lining may then be helically wrapped around the foil tube in a conventional manner.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and sought to be secured by Letters Patent is:

1. A container body comprising a helically wound web having an outer layer and having an inner layer of metallic foil laminated therewith and with the foil being of insufficient strength to sustain the shape of the body, the foil having a strip projecting laterally of one longitudinal edge of the outer layer continuously for the full length of the outer layer, adjacent turns of the foil being overlapped and secured together by a continuous helical seam that is formed by the overlapped face to face engagement of the strip and the foil adjacent to the edge of the successive turn, said seam being backed by the helically wound outer layer, and a continuous weld securing the seam from one end of the body to the other, there being a helical seam of the web that is substantially coincident with the welded seam and overlying the same.

2. A container body according to claim 1 in which the outer layer comprises a non-metallic material.

3. A container body according to claim 1 in which the outer layer is of a fibrous material.

4. A container body according to claim 2 in which the web is overlaid by a jacket that cooperates therewith to sustain the shape of the body.

5. A method of making a helically wound container body, which method comprises winding helically on a mandrel a non metallic web one surface of which has laminated thereto a metallic foil wherein a continuous strip part of the foil extends laterally of one longitudinal edge of the web, forming a helical seam during the winding by overlapping engagement of the laterally extended strip part of the web and the adjacent facing portion of the foil of the preceding turn of the web, and welding the overlapped parts by a weld extending continuously along the seam.

6. A method according to claim 5 in which the web is of paper.

7. A method of making a helically wound container body, which method comprises winding helically on a mandrel a fiber web with the surface of the wound web that is presented toward the mandrel having laminated thereto a metallic foil and wherein a strip of the foil extends laterally of one longitudinal edge of the web for the full length of the web and in which the strip is of a width that is a minor fractional part of the width of the web, forming a helical seam during the winding by overlapping the strip and facing portion of the foil of the preceding turn of the web, and welding the overlapped parts by a weld extending continuously along the seam from one end of the body to the other.

References Cited

UNITED STATES PATENTS

| | | | |
|---|---|---|---|
| 1,433,800 | 10/1922 | Conley | 229—48 |
| 1,455,979 | 5/1923 | Wheelwright | 138—144 |
| 2,131,343 | 9/1938 | Cardiano et al. | 138—144 |
| 2,262,242 | 11/1941 | Lenox | 229—4.5 |
| 2,349,730 | 5/1944 | Horning | 229—4.5 |
| 2,406,758 | 9/1946 | Gazette | 229—4.5 |
| 2,623,680 | 12/1952 | Wilcox | 229—4.5 |
| 2,873,353 | 2/1959 | Rudd | 219—62 |
| 2,891,714 | 6/1959 | Vallas | 229—4.5 |

LAVERNE D. GEIGER, *Primary Examiner.*

EMIL PAUL, C. L. HOUCK, *Assistant Examiners.*